US010083378B2

(12) United States Patent
Chakraborty

(10) Patent No.: US 10,083,378 B2
(45) Date of Patent: Sep. 25, 2018

(54) AUTOMATIC DETECTION OF OBJECTS IN VIDEO IMAGES

(71) Applicant: QUALCOMM Incorporated, San Diego, CA (US)

(72) Inventor: Avijit Chakraborty, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 155 days.

(21) Appl. No.: 15/191,033

(22) Filed: Jun. 23, 2016

(65) Prior Publication Data

US 2017/0185872 A1 Jun. 29, 2017

Related U.S. Application Data

(60) Provisional application No. 62/271,750, filed on Dec. 28, 2015.

(51) Int. Cl.
| | | |
|---|---|---|
| *G06K 9/66* | (2006.01) | |
| *G06K 9/46* | (2006.01) | |
| *G06K 9/62* | (2006.01) | |
| *G06N 3/08* | (2006.01) | |

(52) U.S. Cl.
CPC ............ *G06K 9/66* (2013.01); *G06K 9/4671* (2013.01); *G06K 9/6267* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 7,504,942 B2 | 3/2009 | Marman | |
| 7,667,596 B2* | 2/2010 | Ozdemir | G08B 13/196 340/539.22 |
| 8,437,558 B1* | 5/2013 | Medasani | G06K 9/6211 382/103 |
| 8,542,276 B2 | 9/2013 | Huang et al. | |
| 8,614,741 B2 | 12/2013 | Carlbom et al. | |
| 8,649,594 B1* | 2/2014 | Hua | G06K 9/00771 348/143 |
| 8,930,959 B2 | 1/2015 | Lahr | |
| 9,792,501 B1* | 10/2017 | Maheriya | H04N 13/246 |
| 2002/0036691 A1* | 3/2002 | Franklin | G06Q 30/02 348/143 |

(Continued)

FOREIGN PATENT DOCUMENTS

WO  WO 2008103206 A1 * 8/2008 ........... G08B 13/196

OTHER PUBLICATIONS

Huang, Chung-Lin, and Bing-Yao Liao. "A robust scene-change detection method for video segmentation." IEEE transactions on circuits and systems for video technology 11.12 (2001): 1281-1288.*

(Continued)

*Primary Examiner* — Michelle M Entezari
(74) *Attorney, Agent, or Firm* — Seyfarth Shaw LLP

(57) ABSTRACT

A machine learning model is configured to detect objects from video images. A system monitors video images to identify particular objects. A deep learning process is utilized to learn a baseline pattern. A change due to movement within a field of view is autonomously detected using the deep learning processing. An action is performed based on the detected change.

20 Claims, 12 Drawing Sheets

(56) References Cited

U.S. PATENT DOCUMENTS

| | | | | |
|---|---|---|---|---|
| 2007/0242873 | A1* | 10/2007 | Gupta | G06K 9/00355 |
| | | | | 382/159 |
| 2014/0168427 | A1 | 6/2014 | Argue et al. | |
| 2015/0199010 | A1* | 7/2015 | Coleman | A61B 5/0006 |
| | | | | 345/156 |
| 2015/0363570 | A1* | 12/2015 | Hanina | G06F 19/3456 |
| | | | | 348/143 |
| 2016/0012348 | A1* | 1/2016 | Johnson | G06N 5/027 |
| | | | | 706/12 |
| 2016/0209995 | A1* | 7/2016 | Jeon | G06T 5/003 |
| 2017/0262478 | A1* | 9/2017 | Zepeda Salvatierra | |
| | | | | G06F 17/30271 |

OTHER PUBLICATIONS

Tang, Cong, Yunsong Feng, Xing Yang, Chao Zheng, and Yuanpu Zhou. "The Object Detection Based on Deep Learning." In Information Science and Control Engineering (ICISCE), 2017 4th International Conference on, pp. 723-728. IEEE, 2017.*

Meena, T., Jan. 2014. Using advanced ML for improving surveillance accuracy. In IMpact of E-Technology on US (IMPETUS), 2014 International Conference on the (pp. 34-41). IEEE.*

Dai, B., Hou, Z., Yu, W., Wang, X. And Hu, D., Nov. 2016. Deep learning tracker via SVM ranking vector. In Signal Processing (ICSP), 2016 IEEE 13th International Conference on (pp. 963-968). IEEE.*

Doulamis, Nikolaos, and Anastasios Doulamis. "Semi-supervised deep learning for object tracking and classification." In Image Processing (ICIP), 2014 IEEE International Conference on, pp. 848-852. IEEE, 2014.*

Foggia, P., Saggese, A., Strisciuglio, N. and Vento, M., Aug. 2014. Exploiting the deep learning paradigm for recognizing human actions. In 2014 International Conference on Advanced Video and Signal Based Surveillance (AVSS) (pp. 93-98). IEEE.*

Fernandez-Caballero., et al., "On Motion Detection through a Multi-layer Neural Network Architecture", Neural Networks, Elsevier Science Publishers, Barking, GB, vol. 16, No. 2, Mar. 1, 2003, XP026804418, pp. 205-222.

International Search Report and Written Opinion—PCT/US2016/065197—ISA/EPO—dated Mar. 7, 2017.

Shobha G., et al., "Adaptive Background Modeling and Foreground Detection in Video Sequence Using Artificial Neural Network", Proceedings of International Conference on Intelligent Computational Systems (ICICS'2012), Jan. 7, 2012 (Jan. 7, 2012), XP055349627, Retrieved from the Internet:URL:http:ffpsrcentre.orgjimages/extraimages/108.%200112065.pdf.

Wu Q., et al., "Motion Detection Using Spiking Neural Network Model", Advanced Intelligent Computing Theories and Applications. With Aspects of Artificial Intelligence, Lecture Notes in Computer Science, Springer Berlin Heidelberg, Berlin, Heidelberg, Sep. 15, 2008, XP019104836, pp. 76-83.

Xu P., et al., "Dynamic Background Learning through Deep Autoencoder Networks", Multimedia, ACM, 2 Penn Plaza, Suite 701, New York, NY, 10121-0701, USA, Nov. 3, 2014, pp. 107-116.

* cited by examiner

AUTOMATIC DETECTION OF OBJECTS IN VIDEO IMAGES

CROSS-REFERENCE TO RELATED APPLICATION

The present application claims the benefit of U.S. Provisional Patent Application No. 62/271,750, filed on Dec. 28, 2015, and titled "Automatic Detection of Objects in Video Images," the disclosure of which is expressly incorporated by reference herein in its entirety.

BACKGROUND

Field

Certain aspects of the present disclosure generally relate to machine learning and, more particularly, to deep learning processing for automatically detecting objects in video images.

Background

An artificial neural network, which may comprise an interconnected group of artificial neurons (e.g., neuron models), is a computational device or represents a method to be performed by a computational device.

Convolutional neural networks are a type of feed-forward artificial neural network. Convolutional neural networks may include collections of neurons that each has a receptive field and that collectively tile an input space. Convolutional neural networks (CNNs) have numerous applications. In particular, CNNs have broadly been used in the area of pattern recognition and classification.

Deep learning architectures, such as deep belief networks and deep convolutional networks, are layered neural networks architectures in which the output of a first layer of neurons becomes an input to a second layer of neurons, the output of a second layer of neurons becomes and input to a third layer of neurons, and so on. Deep neural networks may be trained to recognize a hierarchy of features and so they have increasingly been used in object recognition applications. Like convolutional neural networks, computation in these deep learning architectures may be distributed over a population of processing nodes, which may be configured in one or more computational chains. These multi-layered architectures may be trained one layer at a time and may be fine-tuned using back propagation.

Other models are also available for object recognition. For example, support vector machines (SVMs) are learning tools that can be applied for classification. Support vector machines include a separating hyperplane (e.g., decision boundary) that categorizes data. The hyperplane is defined by supervised learning. A desired hyperplane increases the margin of the training data. In other words, the hyperplane should have the greatest minimum distance to the training examples.

Although these solutions achieve excellent results on a number of classification benchmarks, their computational complexity can be prohibitively high. Additionally, training of the models may be challenging.

SUMMARY

In one aspect, a method of detecting objects from video images based on deep learning processing is disclosed. The method includes learning a baseline pattern using the deep learning processing. The method also includes autonomously detecting a change due to movement within a field of view using deep learning processing. The method also includes performing an action based on the detected change.

Another aspect discloses an apparatus for detecting objects from video images based on deep learning processing. The apparatus has a memory and at least one processor coupled to the memory. The processor(s) is configured to learn a baseline pattern using the deep learning processing. The processor(s) is also configured to autonomously detect a change due to movement within a field of view using deep learning processing. The processor(s) is further configured to perform an action based on the detected change.

Another aspect discloses a non-transitory computer-readable medium having non-transitory program code recorded thereon which, when executed by the processor(s), causes the processor(s) to perform operations of learning a baseline pattern using the deep learning processing. The program code also causes the processor(s) to autonomously detect a change due to movement within a field of view using deep learning processing. The program code further causes the processor(s) to perform an action based on the detected change.

Another aspect discloses an apparatus for detecting objects from video images based on deep learning processing is disclosed. The apparatus includes means for learning a baseline pattern using the deep learning processing. The apparatus also includes means for autonomously detecting a change due to movement within a field of view using deep learning processing. The apparatus further includes means for performing an action based on the detected change.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
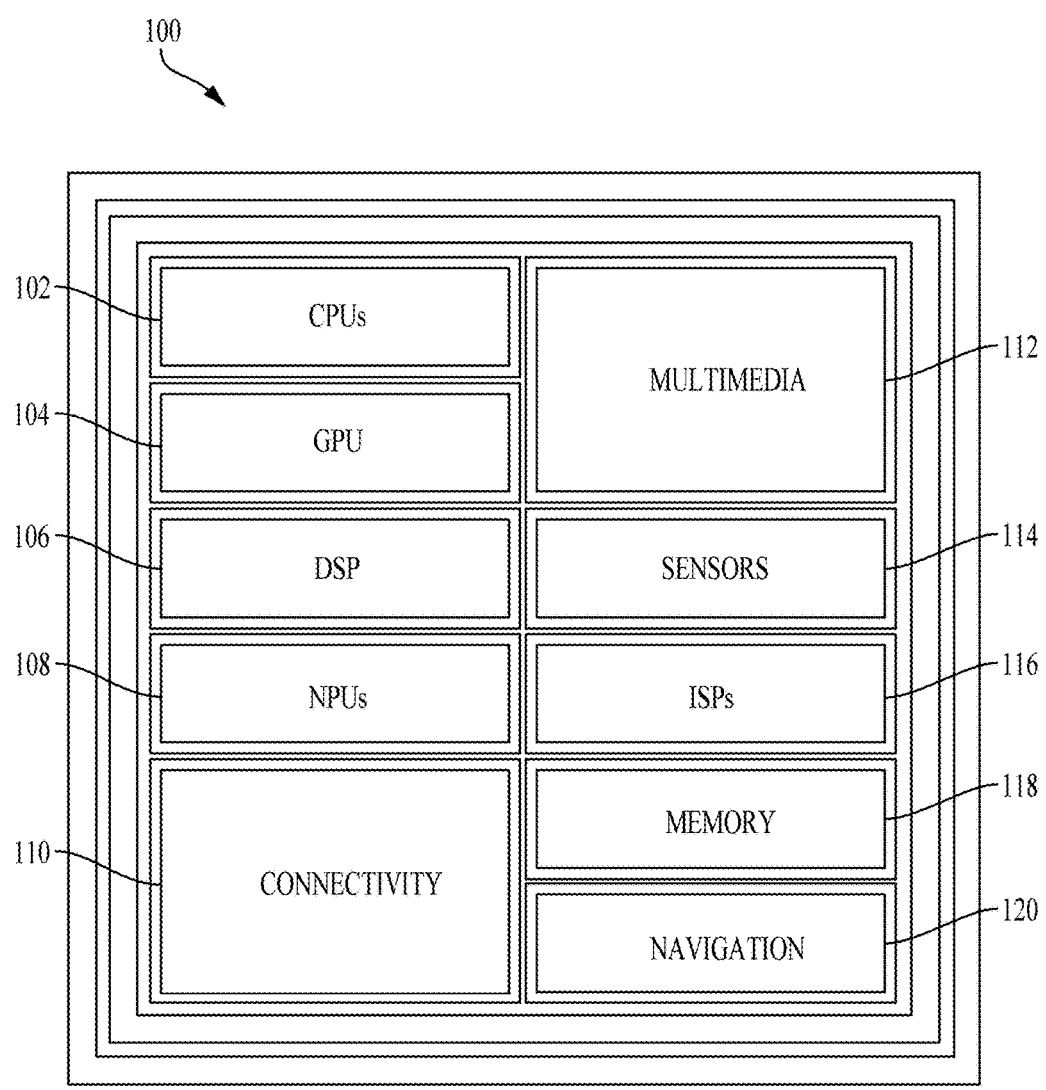
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Aspects of the present disclosure are directed to systems and methods utilizing deep learning processing for training a video camera system to automatically detect objects in an isolated network system (e.g., a network not connected to a cloud). The method and system utilize deep learning processing to learn baseline patterns and then operate autonomously to detect a change due to movement within the field of view. In other words, objects of interest are detected in a scene. Based on the detection, further action may be taken, such as storing images and attempting to identify objects previously learned. The detectable objects are learned from training.

FIG. 1 illustrates an example implementation of the aforementioned systems and methods using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs), and/or navigation 120, which may include a global positioning system.

The SOC 100 may be based on an ARM instruction set. In an aspect of the present disclosure, the instructions loaded into the general-purpose processor 102 may comprise code for learning baseline patterns. The instructions loaded into the general-purpose processor 102 may also comprise code for autonomously detecting moving objects located within a field of view. The instructions loaded into the general-purpose processor 102 may also comprise code for performing an action based on the detected moving object.

Figure 2:
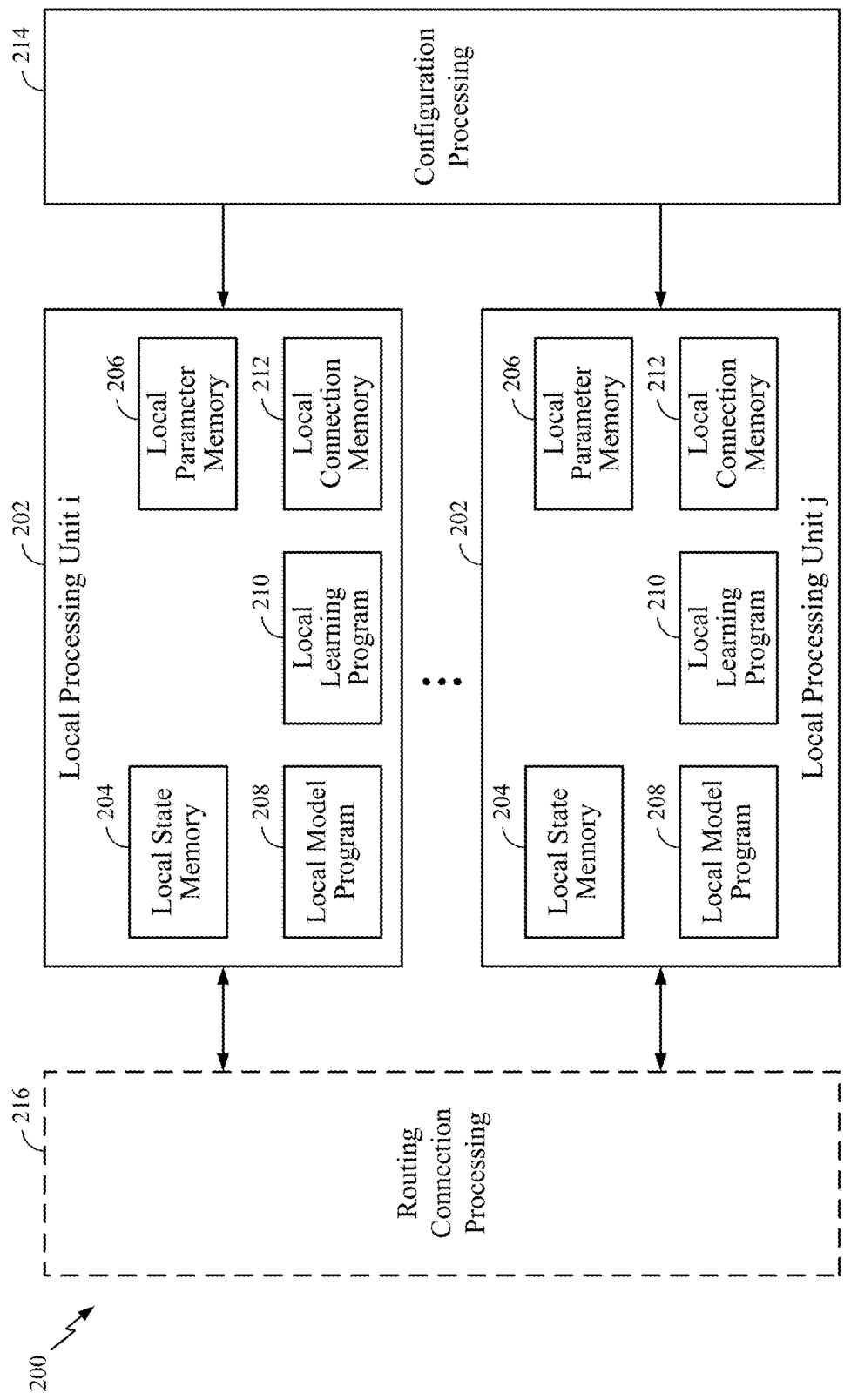
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 3A:
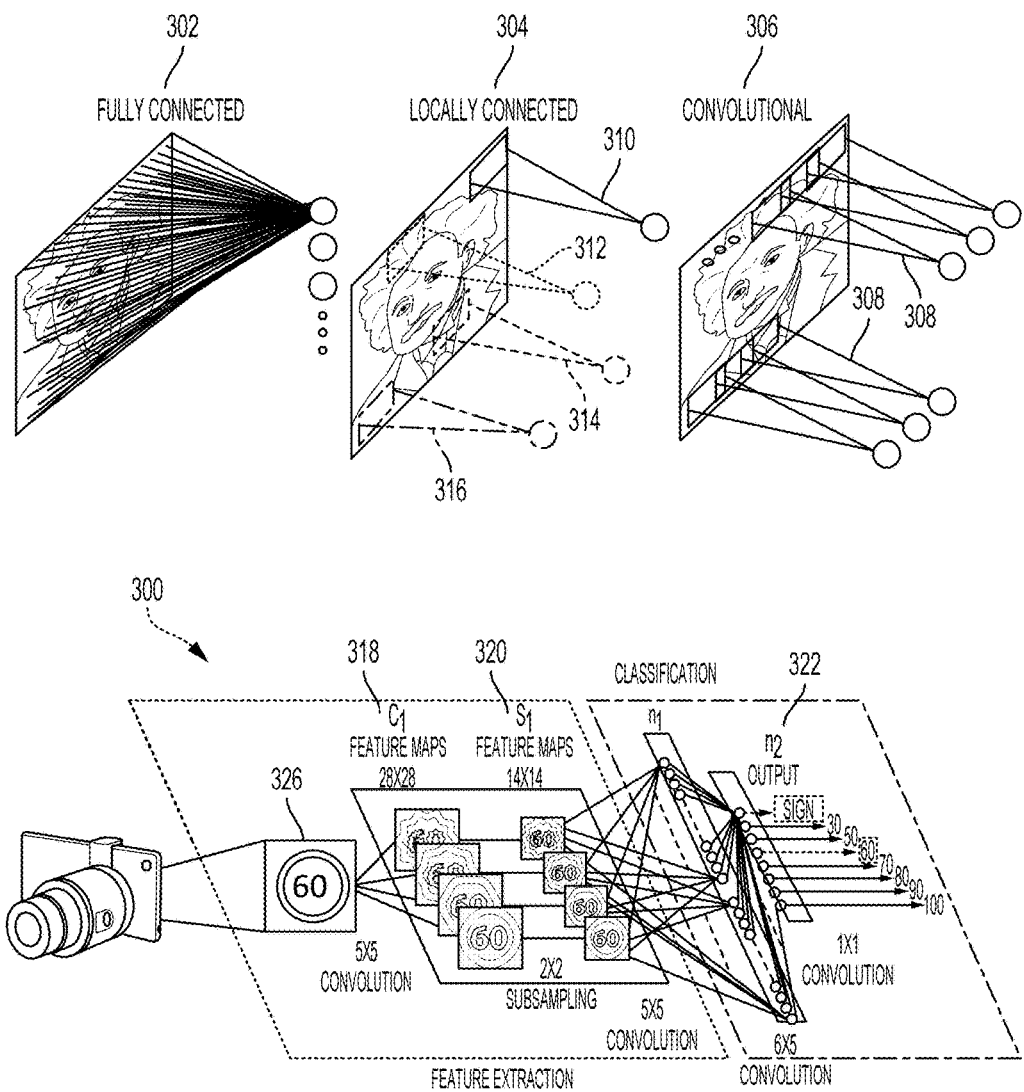
FIG. 3A is a diagram illustrating a neural network in accordance with aspects of the present disclosure.

Referring to FIG. 3A, the connections between layers of a neural network may be fully connected 302 or locally connected 304. In a fully connected network 302, a neuron in a first layer may communicate its output to every neuron in a second layer, so that each neuron in the second layer will receive input from every neuron in the first layer. Alternatively, in a locally connected network 304, a neuron in a first layer may be connected to a limited number of neurons in the second layer. A convolutional network 306 may be locally connected, and is further configured such that the connection strengths associated with the inputs for each neuron in the second layer are shared (e.g., 308). More generally, a locally connected layer of a network may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a network 300 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like.

A deep convolutional network (DCN) may be trained with supervised learning. During training, a DCN may be presented with an image, such as a cropped image of a speed limit sign 326, and a "forward pass" may then be computed to produce an output 322. The output 322 may be a vector of values corresponding to features such as "sign," "60," and "100." The network designer may want the DCN to output a high score for some of the neurons in the output feature vector, for example the ones corresponding to "sign" and "60" as shown in the output 322 for a network 300 that has been trained. Before training, the output produced by the DCN is likely to be incorrect, and so an error may be calculated between the actual output and the target output. The weights of the DCN may then be adjusted so that the output scores of the DCN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images 326 and a forward pass through the network may yield an output 322 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer 318 and 320, with each element of the feature map (e.g., 320) receiving input from a range of neurons in the previous layer (e.g., 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3B:
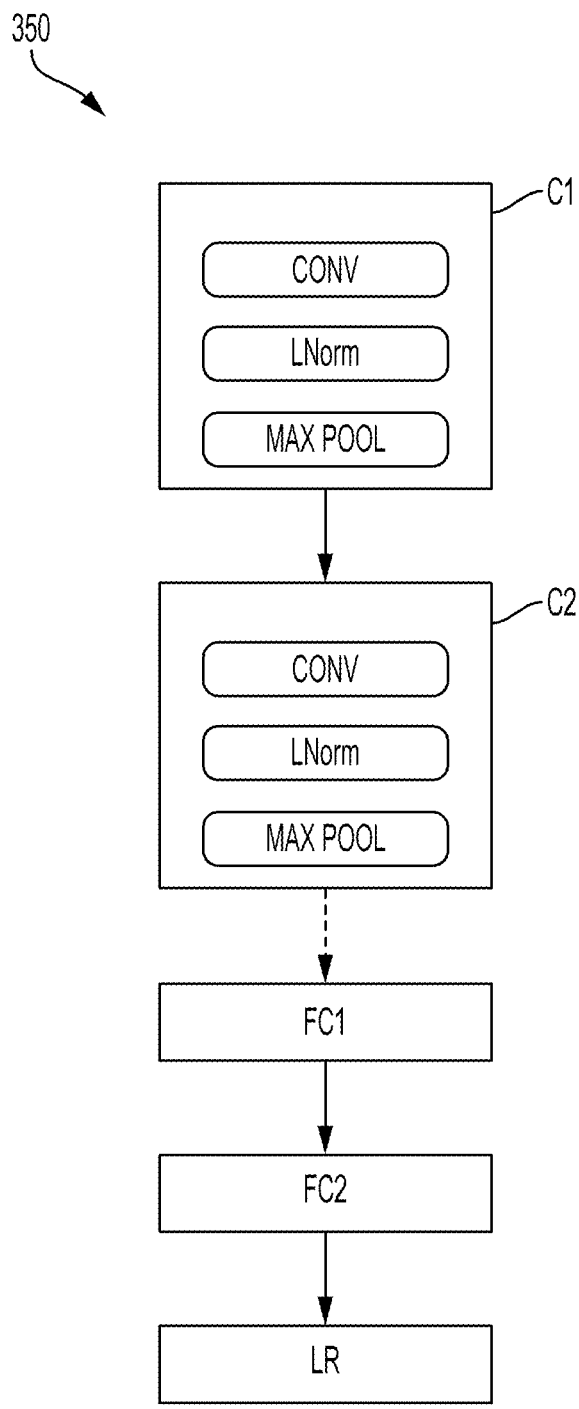
FIG. 3B is a block diagram illustrating an exemplary deep convolutional network (DCN) in accordance with aspects of the present disclosure.

FIG. 3B is a block diagram illustrating an exemplary deep convolutional network 350. The deep convolutional network 350 may include multiple different types of layers based on connectivity and weight sharing. As shown in FIG. 3B, the exemplary deep convolutional network 350 includes multiple convolution blocks (e.g., C1 and C2). Each of the convolution blocks may be configured with a convolution layer, a normalization layer (LNorm), and a pooling layer. The convolution layers may include one or more convolutional filters, which may be applied to the input data to generate a feature map. Although only two convolution blocks are shown, the present disclosure is not so limiting, and instead, any number of convolutional blocks may be included in the deep convolutional network 350 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU 102 or GPU 104 of an SOC 100, optionally based on an ARM instruction set, to achieve high performance and low power consumption. In alternative embodiments, the parallel filter banks may be loaded on the DSP 106 or an ISP 116 of an SOC 100. In addition, the DCN may access other processing blocks that may be present on the SOC, such as processing blocks dedicated to sensors 114 and navigation 120.

The deep convolutional network 350 may also include one or more fully connected layers (e.g., FC1 and FC2). The deep convolutional network 350 may further include a logistic regression (LR) layer. Between each layer of the deep convolutional network 350 are weights (not shown) that are to be updated. The output of each layer may serve as an input of a succeeding layer in the deep convolutional network 350 to learn hierarchical feature representations from input data (e.g., images, audio, video, sensor data and/or other input data) supplied at the first convolution block C1.

Figure 4:
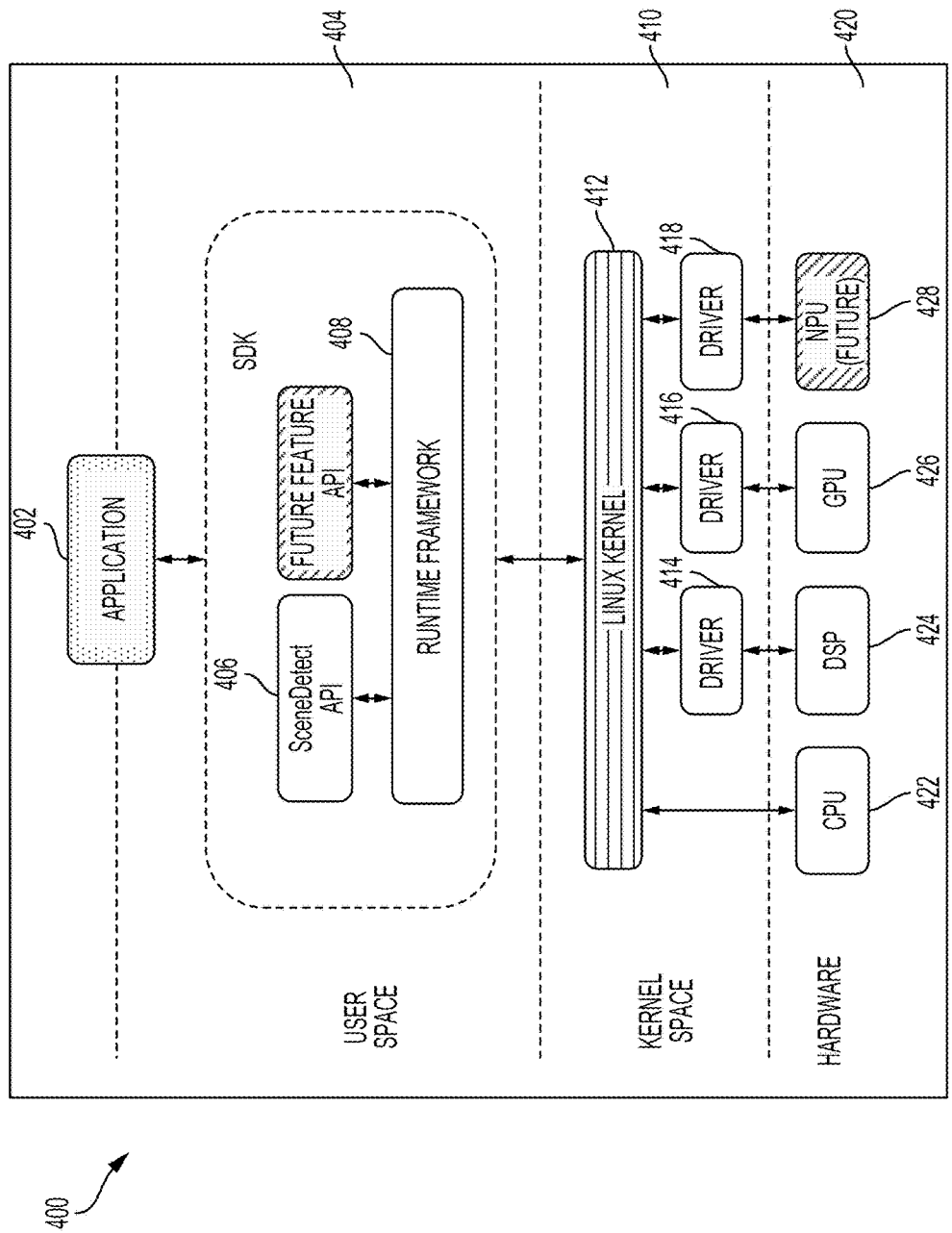
FIG. 4 is a block diagram illustrating an exemplary software architecture that may modularize artificial intelligence (AI) functions in accordance with aspects of the present disclosure.

FIG. 4 is a block diagram illustrating an exemplary software architecture 400 that may modularize artificial intelligence (AI) functions. Using the architecture, applications 402 may be designed that may cause various processing blocks of an SOC 420 (for example a CPU 422, a DSP 424, a GPU 426 and/or an NPU 428) to perform supporting computations during run-time operation of the application 402.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in a SceneDetect application programming interface (API) 406 to provide an estimate of the current scene. This request may ultimately rely on the output of a deep neural network configured to provide scene estimates based on video and positioning data, for example.

A run-time engine 408, which may be compiled code of a Runtime Framework, may be further accessible to the AI application 402. The AI application 402 may cause the run-time engine, for example, to request a scene estimate at a particular time interval or triggered by an event detected by the user interface of the application. When caused to estimate the scene, the run-time engine may in turn send a signal to an operating system 410, such as a Linux Kernel 412, running on the SOC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as a driver 414-418 for a DSP 424, for a GPU 426, or for an NPU 428. In the exemplary example, the deep neural network may be configured to run on a combination of processing blocks, such as a CPU 422 and a GPU 426, or may be run on an NPU 428, if present.

Figure 5:
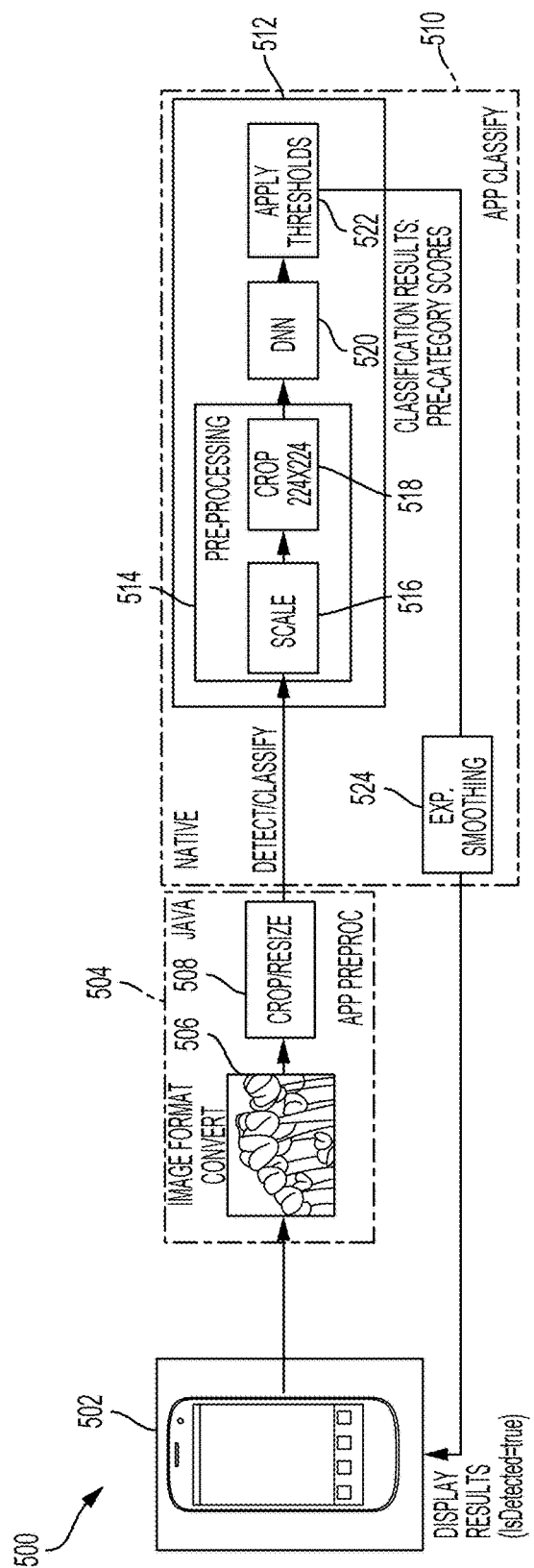
FIG. 5 is a block diagram illustrating the run-time operation of an AI application on a smartphone in accordance with aspects of the present disclosure.

FIG. 5 is a block diagram illustrating the run-time operation 500 of an AI application on a smartphone 502. The AI application may include a pre-process module 504 that may be configured (using for example, the JAVA programming language) to convert the format of an image 506 and then crop and/or resize the image 508. The pre-processed image may then be communicated to a classify application 510 that contains a SceneDetect Backend Engine 512 that may be configured (using for example, the C programming language) to detect and classify scenes based on visual input. The SceneDetect Backend Engine 512 may be configured to further preprocess 514 the image by scaling 516 and cropping 518. For example, the image may be scaled and cropped so that the resulting image is 224 pixels by 224 pixels. These dimensions may map to the input dimensions of a neural network. The neural network may be configured by a deep neural network block 520 to cause various processing blocks of the SOC 100 to further process the image pixels with a deep neural network. The results of the deep neural network may then be thresholded 522 and passed through an exponential smoothing block 524 in the classify application 510. The smoothed results may then cause a change of the settings and/or the display of the smartphone 502.

In one configuration, a deep learning architecture is configured for detecting objects from video images based on deep learning processing. The model includes a learning means, autonomous detection means and/or performing means. In one aspect, the learning means, autonomous detection means, and/or performing means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

According to certain aspects of the present disclosure, each local processing unit 202 may be configured to determine parameters of the model based upon desired one or more functional features of the model, and develop the one or more functional features towards the desired functional features as the determined parameters are further adapted, tuned and updated.

Aspects of the present disclosure are directed to utilizing deep learning processing to detect objects from video images. In a deep learning architecture, the network learns to recognize and extract features (including feature vectors) based on examples provided during a training phase. The training phase may include back propagation in deep neural networks.

In one aspect, the deep learning network trains a system to monitor video images to identify particular objects (e.g., a car, person, etc.) The detection of an object triggers an action (where the action may be pre-configured by a user). For example, when a change is detected, various actions may be performed. Examples of actions include, but are not limited to, storing an image for review by a user, and identifying an object detected within the field of view. The action may be a user-configured action.

In one aspect, a camera controller is taught to determine the baseline pattern. Additionally, the camera controller is configured to learn the baseline pattern, rather than having the baseline programmed into the camera controller. For example, when video images show empty frames, the camera controller is taught how to determine when an object enters the frame, such as an adult, child, or cat walking into the frame. The camera controller is also taught to determine when there is no object movement in the field of view of the camera as compared to when movement occurs. The process is repeated during different times of the day to account for various lighting conditions.

In another example, deep learning processing is utilized to extract feature vectors from video frames. Incoming images are processed by the deep learning network where each layer of the network is responsible for certain aspects of the image. In one example, a first set of feature vectors may be extracted from a first video frame. The first set of feature vectors may be represented as first baseline scores. Additionally, a second set of feature vectors is extracted from a second video frame. The second set of feature vectors are represented as second baseline scores. When the images are very similar to each other, the first and second baseline scores are similar. A baseline pattern is established when the first and second baseline scores are similar to one another. A final baseline score may be calculated based on the average of the first and second baseline scores. When a person (or object) enters a frame, the first and second baseline scores are different. The larger the difference between the first and second baseline scores, then the bigger the change in the images. When the scores deviate, it indicates an object has entered the image. When the scores are close to each other, they represent a class of images that are very similar.

The camera controller is configured to autonomously detect a change due to movement within a field of view using deep learning processing. In one aspect, detecting a change may include extracting feature vectors from a subsequent video frame. A classification score may be calculated for each of the subsequent frames. A change is detected when the classification score for a set number of subsequent frames remains different from the final baseline score.

Figure 6:
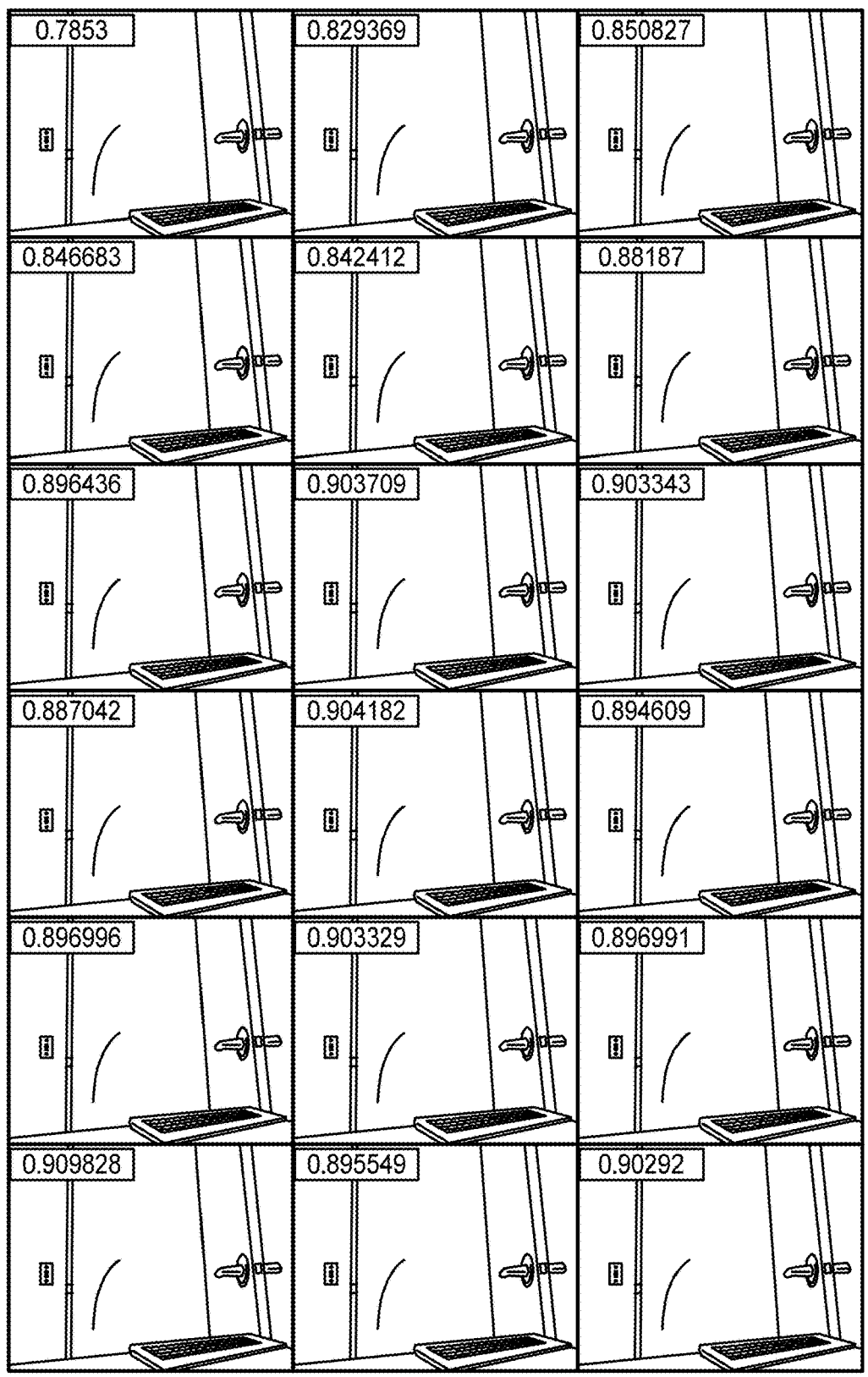
FIG. 6 illustrates example images used to train the camera for determining a baseline according to aspects of the present disclosure.

The following describes an example of training the camera controller. A camera is aimed at a doorway where no person is visible. FIG. 6 illustrates the resulting sequence of images used to train the camera controller. Each image is assigned a classification score. The score may be calculated by a deep convolutional network followed by a support vector machine based classification score, for example. Because the images are static, the classification scores remain within a certain range. These images are used to train the camera controller to learn the baseline (e.g., when there is no change in the images). The beginning (e.g., start) of the video segment may be indicated by a user. Additionally, the end of the segment is also indicated by the user. The length of the segment is T frames. The duration of T depends on the frame rate. The T images may be sub-sampled into a random collection of t images. In one example, T=150 and t=50. The following fine-tuning may be performed on the images. The training process may be iteratively repeated. In one example, the process is repeated over N trials. The scores (e.g., classification results) are calculated for the (T−t) images. The mean of these scores is compared and the lower value is selected as the baseline score.

An object present within the field of view of the images is detected when the classification score changes from the baseline score, and the new score remains or is lower than the baseline score for N successive frames. The variable N depends on the frame rate and may also depend on how fast the object is moving. Once the object is detected to be in the scene, object classification is performed. The classified objects may be compared against previously known objects. Unknown objects may be grouped for user review.

Figure 7:
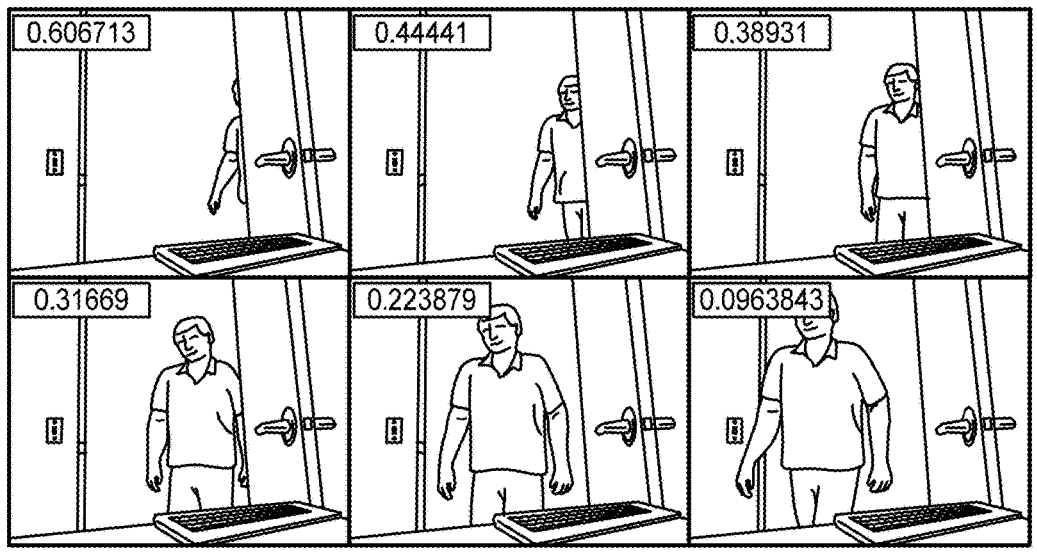
FIG. 7 shows example images illustrating when a person enters the frames according to aspects of the present disclosure.

FIG. 7 illustrates example video images showing a person walking into the field of view. When the classification scores stay below the baseline throughout every frame then, an "object entered" event is triggered. In this example, the score is 0.606713 when an object enters the frame. The last score shown (0.0963843) occurs when the object is within the frame.

Figure 8:
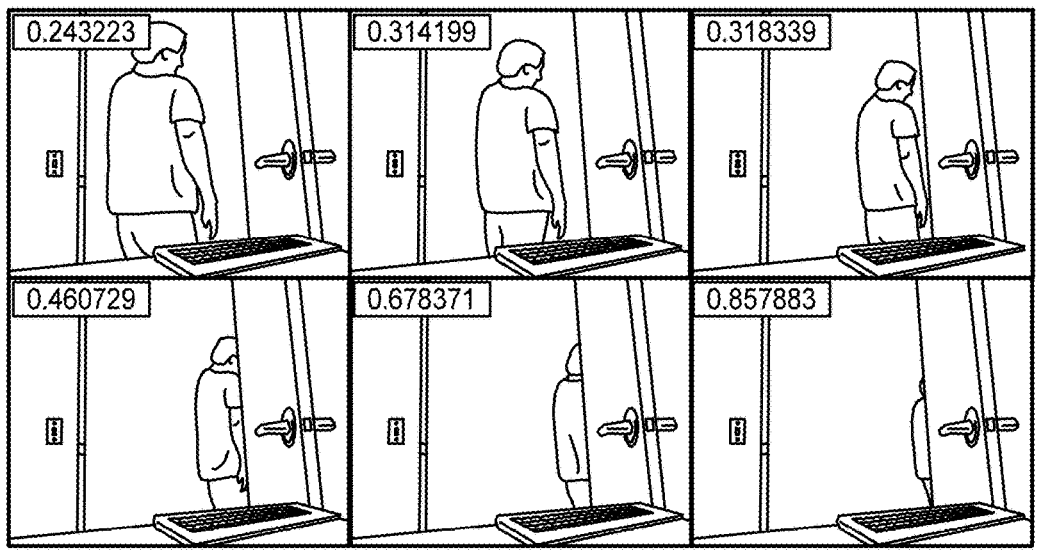
FIG. 8 shows example images illustrating when a person exits out of the frames according to aspects of the present disclosure.

FIG. 8 illustrates example video images when the person walks out of the field of view. In particular, the classification scores begin to change and approach the baseline scores. For example, the last frame shows a score of 0.857883, whereas the baseline ranges from 0.7853 to 0.909828 (see FIG. 6). When the classification scores are close to or higher than the baseline score for N successive frames, an "object exited" event is triggered. The value N depends on the frame rate and also depends on how fast the object is moving.

Figure 9:
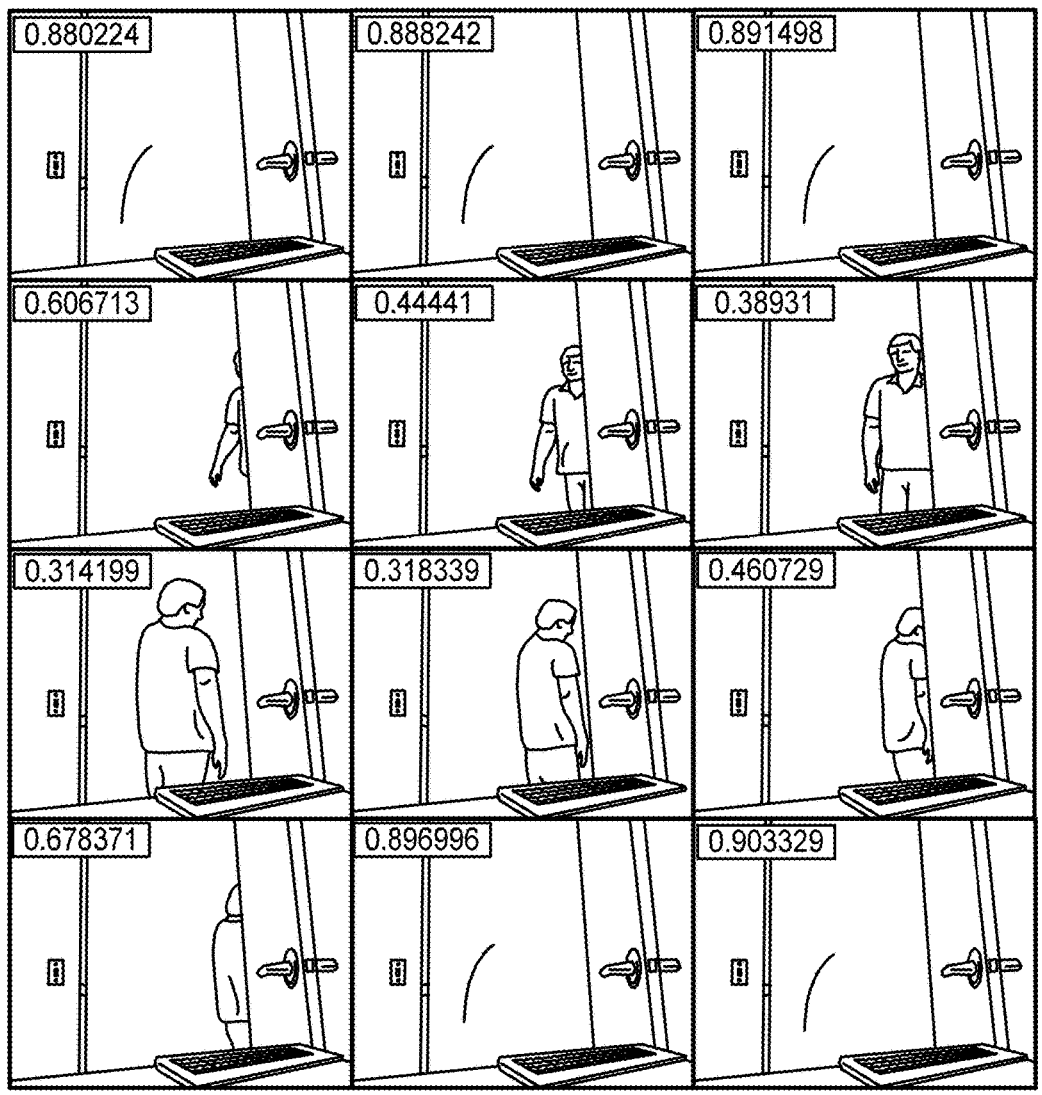
FIG. 9 illustrates changing classification scores when an object enters and exits frames according to aspects of the present disclosure.
Figure 9:
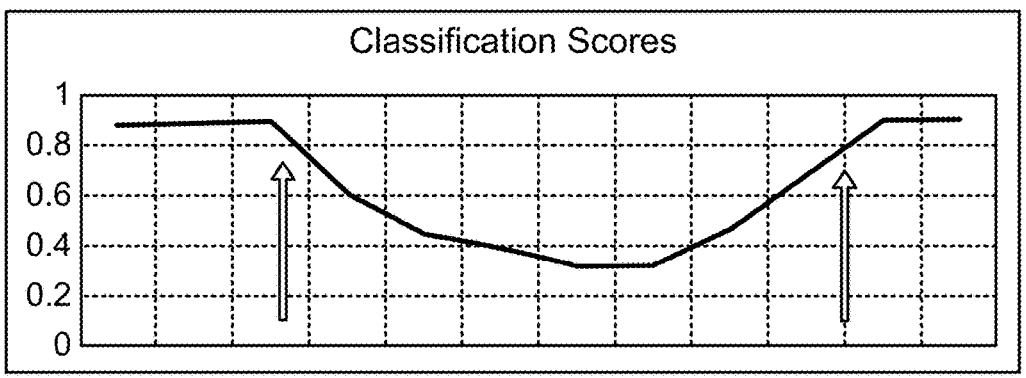

FIG. 9 illustrates images where a person walks into the frames and then exits the frames. The graph below the images illustrates the change in the classification scores as the person enters and exits the frames.

The camera controller can learn an object when an object is detected and is present for M frames. For example, a family member, dog, or specific car type can be learned. Classification scores are assigned to each frame (e.g., Bayesian information criterion scores). The assigned scores are evaluated and possible candidates are determined.

Additionally, the picture quality of the video images may be assessed for factors such as, but not limited to, focus, balanced exposure, and lighting conditions. Next, the best possible objects using the best N images are determined. The best images are the images having the highest picture quality.

The objects can be grouped in bins for user assisted labeling. In one aspect, the grouping is based purely on time, where the frames are successive, to assist the user in labeling the objects properly. The labeling facilitates training.

Once the objects are learned, similar objects are classified the same in the future. Additionally, for learned objects, their respective classification scores are compared. Upon recognizing an object, or upon the occurrence of a specific event, a user can be notified.

Figure 10:
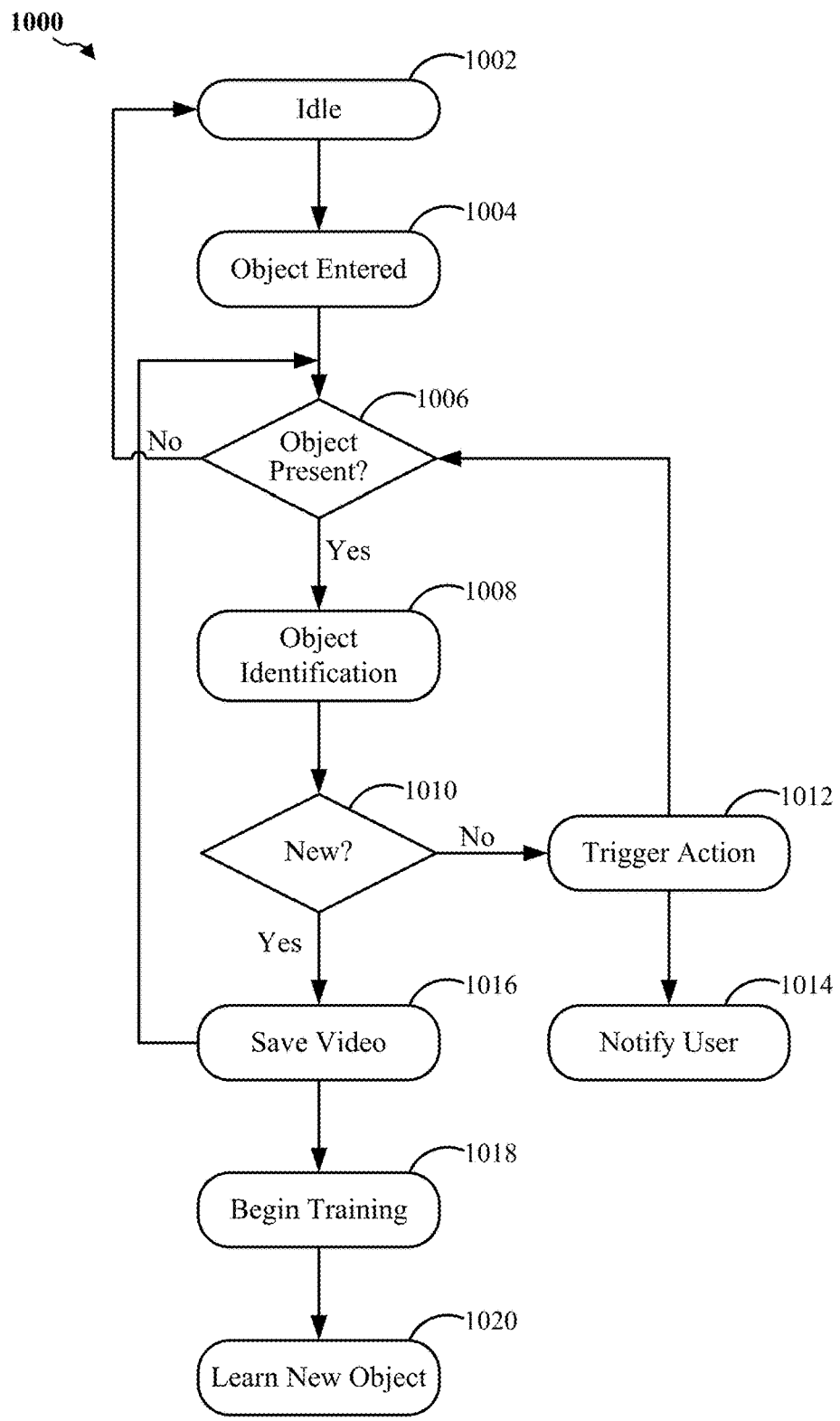
FIG. 10 illustrates an example flow diagram according to aspects of the present disclosure.

FIG. 10 illustrates an example flow diagram 1000 utilized by the camera controller. In particular, the camera controller is trained to learn a baseline from idle images (e.g., images where no movement is detected), starting at block 1002. In one example, a first set of feature vectors may be extracted from a first video frame. The first set of feature vectors may be represented as first baseline scores. Additionally, a second set of feature vectors may be extracted from a second video frame. The second set of feature vectors may be represented as second baseline scores. For images that are very similar to each other, the first and second baseline scores may likewise be similar. A baseline pattern may be established when the first and second baseline scores are similar to one another. In some aspects, a final baseline score may be calculated based on the average of the first and second baseline scores.

Once an object enters the frame, at block 1004, the camera controller determines whether an object is present, at block 1006. For example, when a person (or object) enters a frame, the first and second baseline scores are different. The larger the difference between the first and second baseline scores, then the bigger the change in the images.

If the object is present, the camera controller identifies the object, at block 1008. If no object is present, the camera controller returns to idle at 1002. For example, when the first and second baseline scores deviate, it indicates an object has entered the image. When the first and second baseline scores are close to each other, they represent a class of images that are very similar, and may indicate that no object is present. Once an object is detected to be in the scene, object classification is performed. In one aspect, detecting a change may include extracting feature vectors from a subsequent video frame. A classification score may be calculated for each of the subsequent frames. A change may be detected when the classification score for a set number of subsequent frames remains different from the final baseline score.

If the object is not new, at block 1010, an action may be triggered, at block 1012. For example, the classified objects may be compared against previously known objects to determine whether the object is not new. Once the objects are learned, similar objects are classified the same in the future. Additionally, for learned objects, their respective classification scores are compared. In one aspect, the objects can be grouped in bins for user assisted labeling. For example, the grouping can be based purely on time, where the frames are successive, to assist the user in labeling the objects properly.

From block 1012, after the triggered action takes place, the process returns to block 1006 to determine whether another object is present. For example, an object present within the field of view of the images is detected when the classification score changes from the baseline score, and the new score remains or is lower than the baseline score for N successive frames. The variable N depends on the frame rate and may also depend on how fast the object is moving.

On the other hand, if a notification that the user previously configured arrives, the process proceeds from block 1012 to block 1014, where the user is notified. In one example, upon recognizing an object, or upon the occurrence of a specific event, the user is notified of the presence of the object or the occurrence.

If the object is new at block 1010, the camera controller may save the video at block 1016 for training purposes. For example, unknown objects will have classification scores different from the previously assigned classification scores, and may be grouped for user review. In one aspect, the objects can be grouped in bins for user assisted labeling. For example, the grouping can be based purely on time, where the frames are successive, to assist the user in labeling the objects properly. In related aspects, the previously assigned classification scores are evaluated and possible candidates are determined.

From block 1016, the process may branch into two simultaneous or nearly simultaneous actions. At block 1018, the process performs training on the saved images to learn the determined new object at block 1020. In one example, the camera controller can learn an object when an object is detected and is present for M frames. For example, a family member, dog, or specific car type can be learned. Classification scores are assigned to each frame (e.g., Bayesian information criterion scores).

Simultaneously or nearly simultaneously, after the video is saved at block 1016, the process returns to block 1006 to determine whether another object is present.

Another aspect of the present disclosure is directed to an automatic calibration feature. The camera controller detects the baseline period during the automatic calibration and runs a score computation. The camera controller compares the scores with the average of the baseline score. When the average differs more than M percentage from the baseline score, a user assisted re-calibration is performed. For example, if the door is no longer in the field of view, the system can ask the user whether the baseline picture is still the same. If not, the user can adjust the camera. Additionally a new baseline computation may be initiated when the adjusted camera points at a new location.

Figure 11:
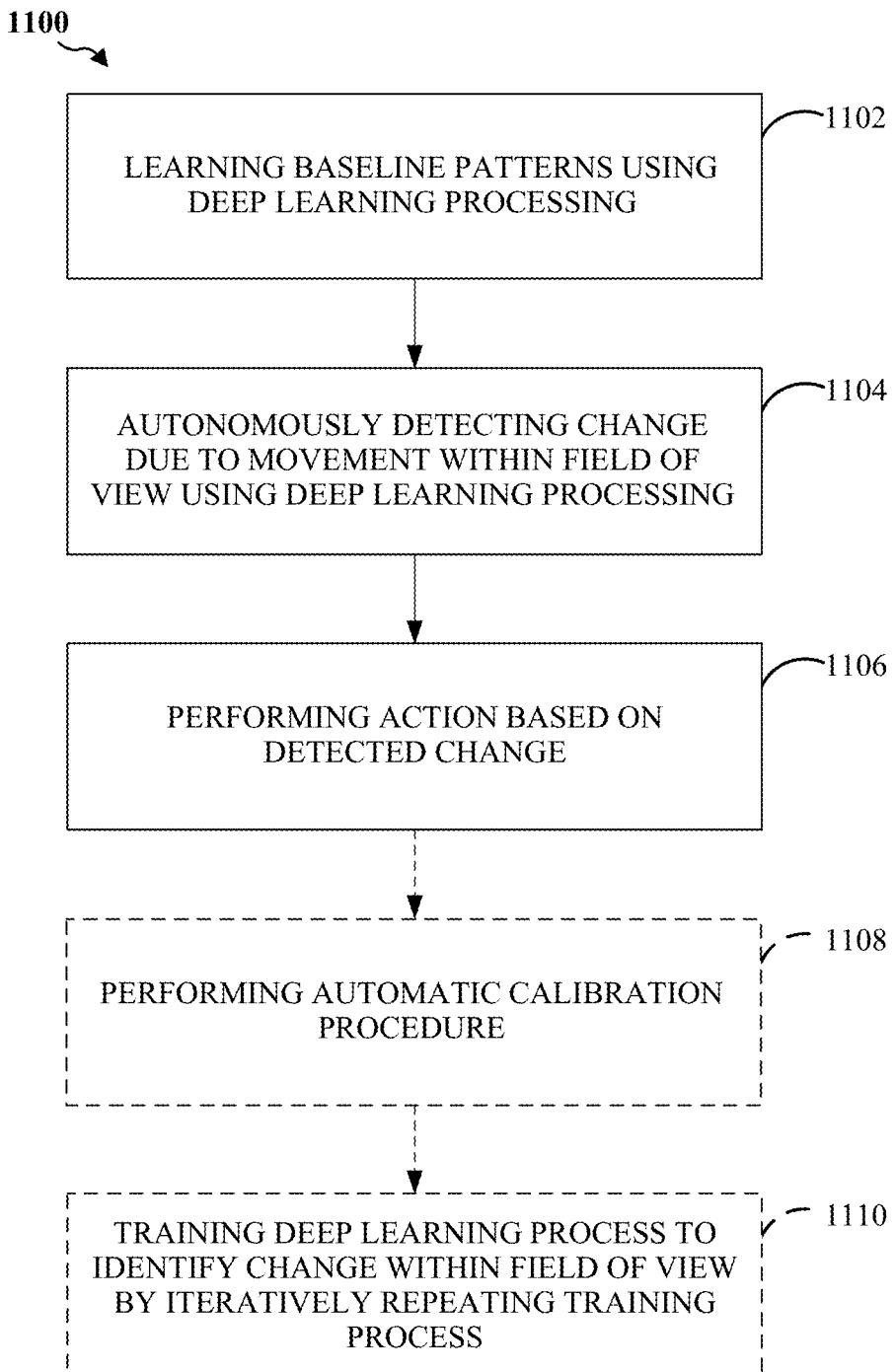
FIG. 11 illustrates an example flow diagram for detecting objects in video images according to aspects of the present disclosure.

FIG. 11 illustrates a method 1100 for detecting objects from video images based on deep learning processing. In block 1102, the process uses deep learning processing to learn baseline patterns. In one example, a first set of feature vectors may be extracted from a first video frame. The first set of feature vectors may be represented as first baseline scores. Additionally, a second set of feature vectors is extracted from a second video frame. The second set of feature vectors are represented as second baseline scores. When the images are very similar to each other, the first and second baseline scores are similar. A baseline pattern is established when the first and second baseline scores are similar to one another. A final baseline score may be calculated based on the average of the first and second baseline scores. When a person (or object) enters a frame, the first and second baseline scores are different. The larger the difference between the first and second baseline scores, then the bigger the change in the images. When the scores deviate, it indicates an object has entered the image. When the scores are close to each other, they represent a class of images that are very similar.

In block 1104, the process autonomously detects moving objects located within a field of view using deep learning processing. In one aspect, detecting a change may include extracting feature vectors from a subsequent video frame. A classification score may be calculated for each of the subsequent frames. A change is detected when the classification score for a set number of subsequent frames remains different from the final baseline score.

Furthermore, in block 1106, the process performs an action based on the detected moving object. For example, the camera controller can learn an object when an object is detected and is present for M frames. For example, a family member, dog, or specific car type can be learned. Classification scores are assigned to each frame (e.g., Bayesian information criterion scores). The assigned scores are evaluated and possible candidates are determined. In related aspects, the objects can be grouped in bins for user assisted labeling. In one aspect, the grouping is based purely on time, where the frames are successive, to assist the user in labeling the objects properly. The labeling facilitates training.

Optionally, in some aspects, the method 1100 may further comprise an automatic calibration procedure at 1108. For example, the camera controller may detect the baseline period during the automatic calibration and runs a score computation. The camera controller compares the scores with the average of the baseline score. When the average differs more than M percentage from the baseline score, a user assisted re-calibration is performed. For example, if the door is no longer in the field of view, the system may prompt the user to indicate whether the baseline picture is still the same. If not, the user can adjust the camera. Additionally, a new baseline computation may be initiated if the adjusted camera points at a new location.

Furthermore, in some aspects, the method may comprise training the deep learning process to identify a change within the field of view by iteratively repeating the training process at block 1110. In one example, the process is repeated over N trials, where N is an integer greater than zero. The scores (e.g., classification results) may be calculated for the (T−t) images, where T is a length of a segment in frames and t is a number of images. The mean of these scores may be compared and the lower value is selected as the baseline score. The duration of T depends on the frame rate. The T images may be sub-sampled into a random collection of t images. In one example, T=150 and t=50.

Figure 12:
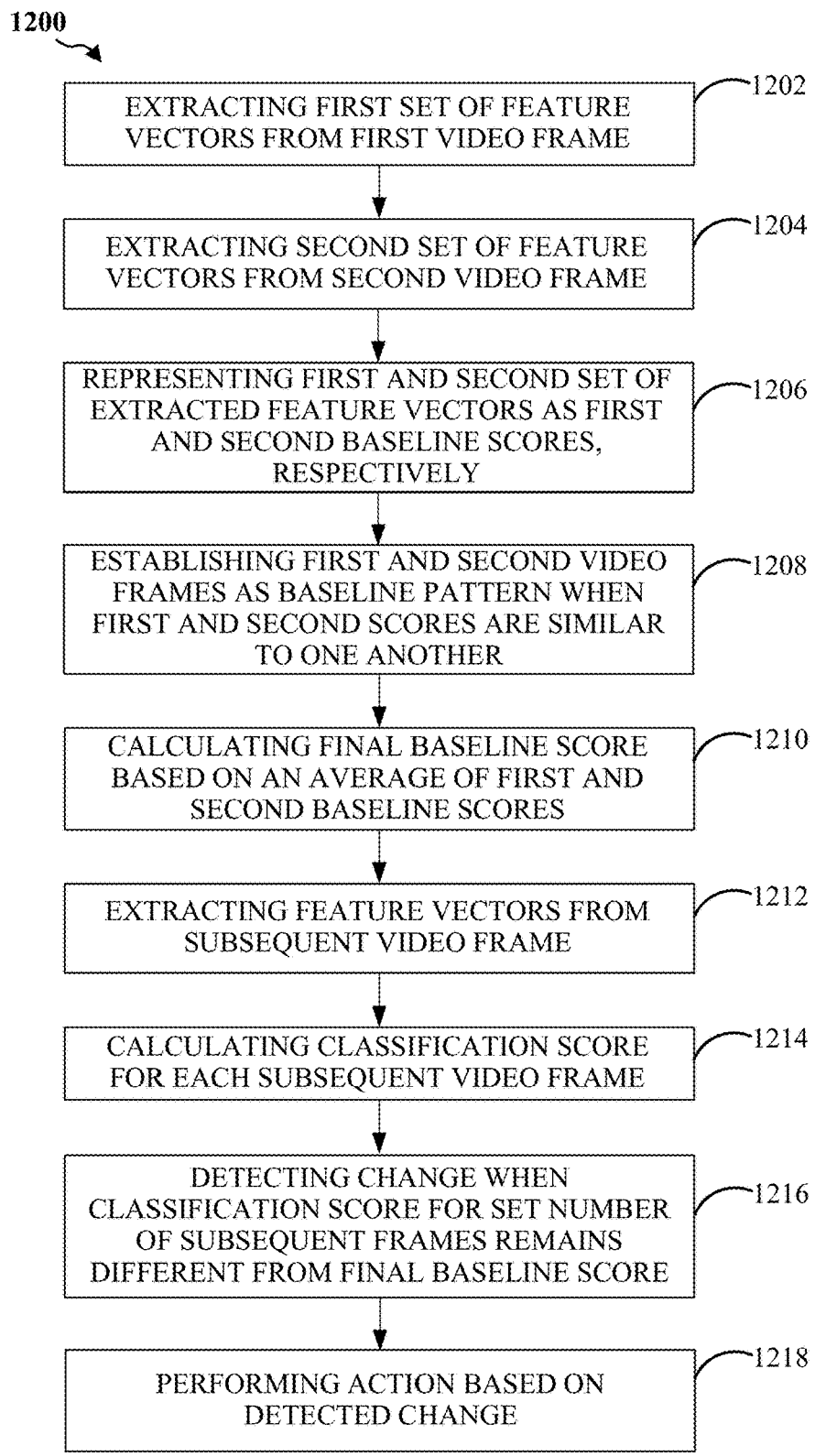
FIG. 12 illustrates an example flow diagram for detecting objects in video images according to aspects of the present disclosure.

FIG. 12 illustrates a method 1200 for detecting objects from video images based on deep learning processing. In block 1202, the process extracts a first set of feature vectors from a first video frame. For example, the feature vectors can be represented as a numerical value, and can correspond to features in the video frame such as a desk, door, person, etc.

In block 1204, a second set of feature vectors is extracted from a second video frame. For example, the feature vectors can be represented as a numerical value, and can correspond to features in the video frame such as a desk, door, person, etc.

In block 1206, the first and second set of extracted feature vectors are represented as first and second baseline scores, respectively. For example, the length of a segment can be T frames. The duration of T depends on a frame rate. The T images may be sub-sampled into a random collection of t images. In one example, T=150 and t=50. The following fine-tuning may be performed on the images. The training process may be iteratively repeated. In one example, the process is repeated over N trials. The scores (e.g., classification results) are calculated for the (T−t) images. The mean of these scores is compared and the lower value is selected as the baseline score.

In block 1208, a baseline pattern is established when the first and second baseline scores are similar to one another. For example, the baseline pattern can be used to determine an idle state that is used to determine when an object is present.

In block 1210, a final baseline score is calculated based on the average of the first and second baseline scores. In one example, when a person (or object) enters a frame, the first and second baseline scores are different. The larger the difference between the first and second baseline scores, then the bigger the change in the images. When the scores deviate, it indicates an object has entered the image. When the scores are close to each other, they represent a class of images that are very similar.

In block 1212, feature vectors are extracted from a subsequent video frame. For example, the feature vectors can be represented as a numerical value, and can correspond to features in the video frame such as a desk, door, person, etc.

In block 1214, a classification score is calculated for each of the subsequent frames. For example, the score may be calculated by a deep convolutional network followed by a support vector machine based classification score. If the images are static, the classification scores will remain within a certain range. These images can be used to train the camera controller to learn the baseline (e.g., when there is no change in the images). The beginning (e.g., start) of the video segment may be indicated by a user. Additionally, the end of the segment is also indicated by the user.

In block 1216, a change is detected when the classification score for a set number of subsequent frames remains different from the final baseline score. For example, when the classification scores stay below the baseline throughout every frame then, an "object entered" event is triggered. Alternatively, when the classification scores are close to or higher than the baseline score for N successive frames, an "object exited" event is triggered. The value N depends on the frame rate and also depends on how fast the object is moving. A graph can be used to illustrate the change in the classification scores as a person enters and exits the frames.

Furthermore, in block 1218, the process performs an action based on the detected change. For example, the camera controller can learn an object when an object is detected and is present for M frames. For example, a family member, dog, or specific car type can be learned. Classification scores are assigned to each frame (e.g., Bayesian information criterion scores). The assigned scores are evaluated and possible candidates are determined. In related aspects, the objects can be grouped in bins for user assisted labeling. In one aspect, the grouping is based purely on time, where the frames are successive, to assist the user in labeling the objects properly. The labeling facilitates training.

In some aspects, methods 1000, 1100, and 1200 may be performed by the SOC 100 (FIG. 1) or the system 200 (FIG. 2). That is, each of the elements of methods 1000, 1100, and 1200 may, for example, but without limitation, be performed by the SOC 100 or the system 200 or one or more processors (e.g., CPU 102 and local processing unit 202) and/or other components included therein.

The various operations of methods described above may be performed by any suitable means capable of performing the corresponding functions. The means may include various hardware and/or software component(s) and/or module (s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all of which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of detecting objects from video images based on deep learning processing, the method comprising:

learning a baseline pattern from baseline scores obtained using the deep learning processing, the baseline pattern comprising feature vectors; and autonomously detecting a change due to movement within a field of view using the deep learning processing based on a difference between the baseline scores and classification scores of a plurality of subsequent video frames, the detected change increasing or lowering the classification score.

2. The method of claim 1, in which learning the baseline pattern comprises:

extracting a first set of feature vectors from a first video frame;

extracting a second set of feature vectors from a second video frame;

representing the first and second set of extracted feature vectors as first and second baseline scores, respectively; and establishing the first and second video frames as the baseline pattern when the first and second baseline scores are similar to one another.

3. The method of claim 2, further comprising calculating a final baseline score based on an average of the first and second baseline scores.

4. The method of claim 3, in which detecting the change comprises:

extracting feature vectors from the plurality of subsequent video frames;

calculating a classification score for each subsequent video frame of the plurality of subsequent video frames; and detecting the change when the classification score for a set number of the plurality of subsequent video frames remains different from the final baseline score.

5. The method of claim 1, further comprising storing an image for review by a user based on the detected change.

6. The method of claim 1, further comprising identifying an object detected within the field of view based on the detected change.

7. The method of claim 1, further comprising performing a user-configured action based on the detected change.

8. The method of claim 1, further comprising performing an automatic calibration procedure.

9. The method of claim 1, further comprising training the deep learning processing to identify the change within the field of view by iteratively repeating training.

10. An apparatus for detecting objects from video images based on deep learning processing, comprising:

a memory; and at least one processor coupled to the memory, the at least one processor configured:

to learn a baseline pattern from baseline scores obtained using the deep learning processing, the baseline pattern comprising feature vectors; and to autonomously detect a change due to movement within a field of view using the deep learning processing based on a difference between the baseline scores and classification scores of a plurality of subsequent video frames, the detected change increasing or lowering the classification score.

11. The apparatus of claim 10, in which the at least one processor is further configured to learn the baseline pattern by:

extracting a first set of feature vectors from a first video frame;

extracting a second set of feature vectors from a second video frame;

representing the first and second set of extracted feature vectors as first and second baseline scores, respectively; and establishing the first and second video frames as the baseline pattern when the first and second baseline scores are similar to one another.

12. The apparatus of claim 11, in which the at least one processor is further configured to calculate a final baseline score based on an average of the first and second baseline scores.

13. The apparatus of claim 12, in which the at least one processor is configured to detect the change by:

extracting feature vectors from the plurality of subsequent video frames;

calculating a classification score for each subsequent video frame of the plurality of subsequent video frames; and detecting the change when the classification score for a set number of the plurality of subsequent video frames remains different from the final baseline score.

14. The apparatus of claim 10, in which the at least one processor is configured to store an image for review by a user based on the detected change.

15. The apparatus of claim 10, in which the at least one processor is configured to identify an object detected within the field of view based on the detected change.

16. The apparatus of claim 10, in which the at least one processor is configured to perform a user-configured action based on the detected change.

17. The apparatus of claim 10, in which the at least one processor is further configured to perform an automatic calibration procedure.

18. The apparatus of claim 10, in which the at least one processor is further configured to train the deep learning processing to identify the change within the field of view by iteratively repeating training.

19. A non-transitory computer-readable medium having program code recorded thereon for detecting objects from video images based on deep learning processing, the program code being executed by a processor and comprising:

program code to learn a baseline pattern from baseline scores obtained using the deep learning processing, the baseline pattern comprising feature vectors; and program code to autonomously detect a change due to movement within a field of view using the deep learning processing based on a difference between the baseline scores and classification scores of a plurality of subsequent video frames, the detected change increasing or lowering the classification score.

20. An apparatus for detecting objects from video images based on deep learning processing, the apparatus comprising:

means for learning a baseline pattern from baseline scores obtained using the deep learning processing, the baseline pattern comprising feature vectors;

means for autonomously detecting a change due to movement within a field of view using the deep learning processing based on a difference between the baseline scores and classification scores of a plurality of subsequent video frames, the detected change increasing or lowering the classification score.

* * * * *